（12）United States Patent
Hajas et al.

(10) Patent No.: US 12,481,514 B2
(45) Date of Patent: Nov. 25, 2025

(54) VOLUMETRIC USER INTERFACE LAYERS FOR ELECTRONIC DEVICES

(71) Applicant: Apple Inc., Cupertino, CA (US)

(72) Inventors: Peter L. Hajas, Lafayette, CO (US);
Jason M. Cahill, Woodinville, WA (US); Raffael Hannemann, Paris (FR)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 18/510,629

(22) Filed: Nov. 15, 2023

(65) Prior Publication Data

US 2024/0403076 A1 Dec. 5, 2024

Related U.S. Application Data

(60) Provisional application No. 63/470,941, filed on Jun. 4, 2023.

(51) Int. Cl.
*G06F 9/451* (2018.01)
*G06F 3/04845* (2022.01)
*G06T 19/00* (2011.01)

(52) U.S. Cl.
CPC .......... *G06F 9/451* (2018.02); *G06F 3/04845* (2013.01); *G06T 19/006* (2013.01)

(58) Field of Classification Search
CPC .... G06F 9/451; G06F 3/04845; G06T 19/006
See application file for complete search history.

(56) References Cited

U.S. PATENT DOCUMENTS

| 10,078,917 | B1 | 9/2018 | Gaeta et al. |
| 11,150,777 | B2 * | 10/2021 | Kaehler ................ G06T 19/006 |
| 2019/0172262 | A1 * | 6/2019 | McHugh ................ G06F 3/011 |
| 2023/0143891 | A1 | 5/2023 | Kahan et al. |

OTHER PUBLICATIONS

PCT/US2024/030646; International Search Report and Written Opinion dated Aug. 1, 2025, 9 pages.

* cited by examiner

*Primary Examiner* — Haoshian Shih
(74) *Attorney, Agent, or Firm* — BAKERHOSTETLER

(57) ABSTRACT

Aspects of the subject technology provide volumetric interface layers for an electronic device. The volumetric interface layers may be discrete distance layers, each having a respective distance from the electronic device, in which user interfaces can be displayed by the electronic device. Applications running on the electronic device may be provided with the ability to request display of a user interface for the application in one of the discrete distance layers. In one or more implementations, the discrete distance layers may be semantically labeled, and may be requested by an application using their semantic labels.

20 Claims, 10 Drawing Sheets

VOLUMETRIC USER INTERFACE LAYERS FOR ELECTRONIC DEVICES

CROSS REFERENCE TO RELATED APPLICATIONS

This application claims the benefit of U.S. Provisional Application No. 63/470,941, entitled "VOLUMETRIC USER INTERFACE LAYERS FOR ELECTRONIC DEVICES," filed on Jun. 4, 2023, the disclosure of which is hereby incorporated herein in its entirety.

TECHNICAL FIELD

The present description relates generally to electronic devices including, for example, volumetric user interface layers for electronic devices.

BACKGROUND

Electronic devices often include displays on which user interfaces are displayed. Typically, the user interfaces are arranged in two-dimensions on a two-dimensional display of an electronic device.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
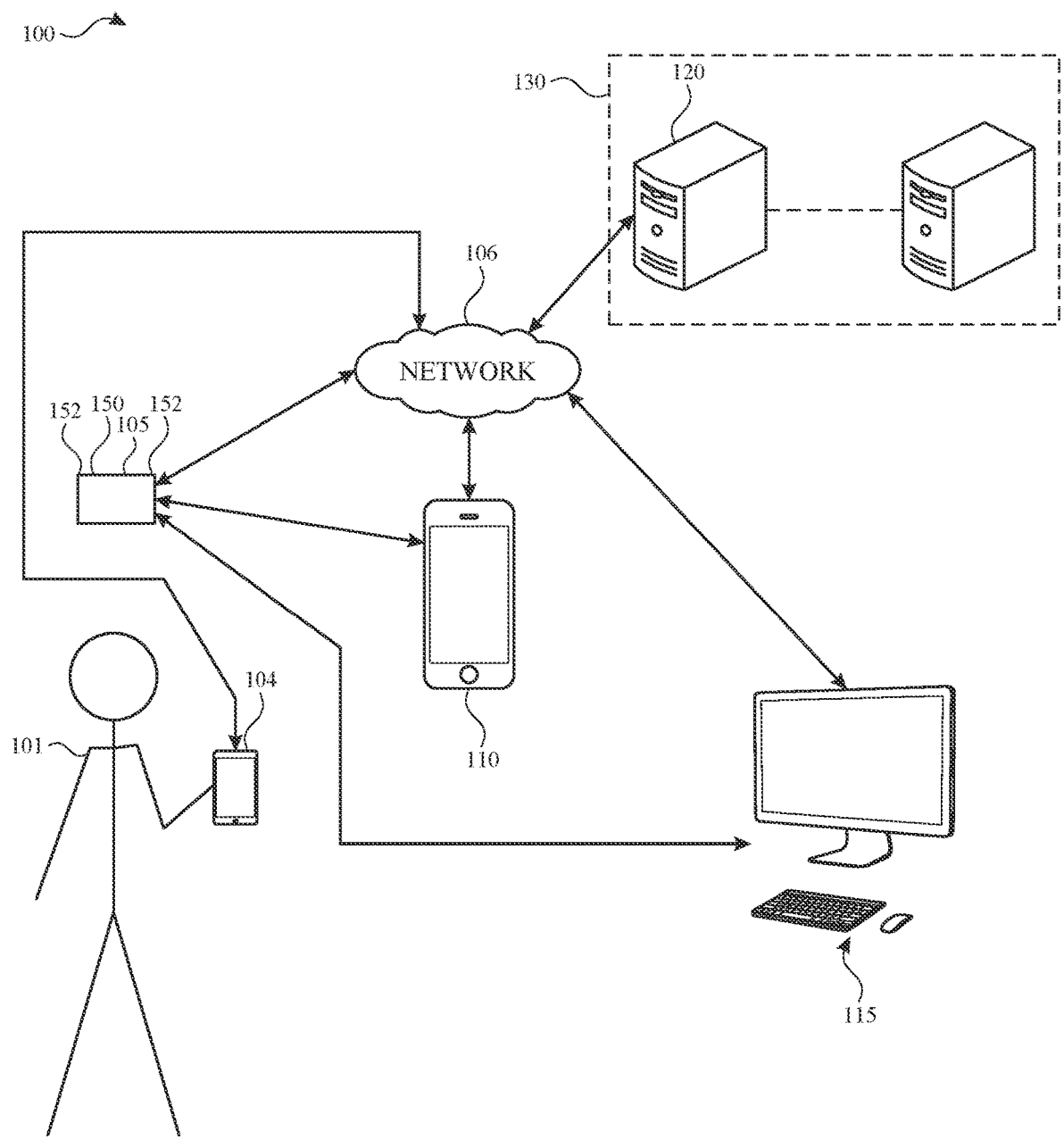
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Electronic devices often display information that is distributed, in two dimensions, on a two-dimensional display, such as a liquid crystal display or light-emitting diode (e.g., an organic light-emitting diode, or OLED), on which each display pixel is arranged to be viewed concurrently by both eyes of a user. Some electronic devices, such as XR headsets, have the capability of displaying information on one or more two-dimensional displays that appears, to a viewer of the display, to be distributed in three-dimensions (e.g., by displaying arranging the display(s) and/or portions thereof to be viewed differently by the two eyes of a user). Some electronic devices may provide applications with the ability display a user interface (UI), such that the user interface appears at any three-dimensional position and/or orientation in a three-dimensional XR environment. However, in some use cases, providing this ability to an application can reveal personal or private information about the user to the application. For example, allowing an application to position multiple UI windows at multiple locations and oriented toward the user can reveal, to the application, three dimensional position and/or activity information about the user. Accordingly, it may be desirable to provide privacy-preserving UI positioning for electronic devices.

Implementations of the subject technology described herein provide system-defined, discrete, three-dimensional distance layers that can be semantically requested by applications, for positioning and display of user interfaces (UIs) of the applications. In this way, user privacy can be protected (e.g., by preventing applications from deriving user information from positioning of application UIs). In one or more implementations, users can be provided with the ability to adjust the system-defined discrete layers, but applications may be prevented from modifying the system-defined discrete layers or displaying UI information outside of the system-defined discrete layers.

In one or more implementations, the layers can be semantically labeled by a system-level process (e.g., an operating system process), and can be requested by applications using the semantic labels. As examples, the layers can include a first or nearest layer (e.g., a "utility" layer) for keyboards and/or other data entry tools; a second or next nearest layer (e.g., a "work" layer) for full-scale application UIs; a third layer (e.g., a peripheral layer), beyond the second layer, for low information density UI elements (e.g., widgets, notifications, calendar events, or the like); and a fourth layer, beyond the third layer, for background, backdrop, ambient, and/or scene content. In one or more implementations, the information density and/or information content in an application UI, and/or the application UI shape/size/form/etc., can vary according to which of the discrete system-defined layers the UI is displayed in. A user can be provided with the ability to move application UIs between the discrete layers in one or more implementations.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smartphone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use an electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging and/or providing power to the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a living being such as a person or a pet, a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects for an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone, a portable computing device such as a laptop computer, a peripheral device (e.g., a digital camera, headphones), a tablet device, a wearable device such as a watch, a band, and the like, any other appropriate device that includes, for example, processing circuitry, memory, a display, and/or communications circuitry for communicating with one or more other devices. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the electronic device 104, and/or the electronic device 105 may be, and/or may include all or part of, the electronic system discussed below with respect to FIG. 10. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 10.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
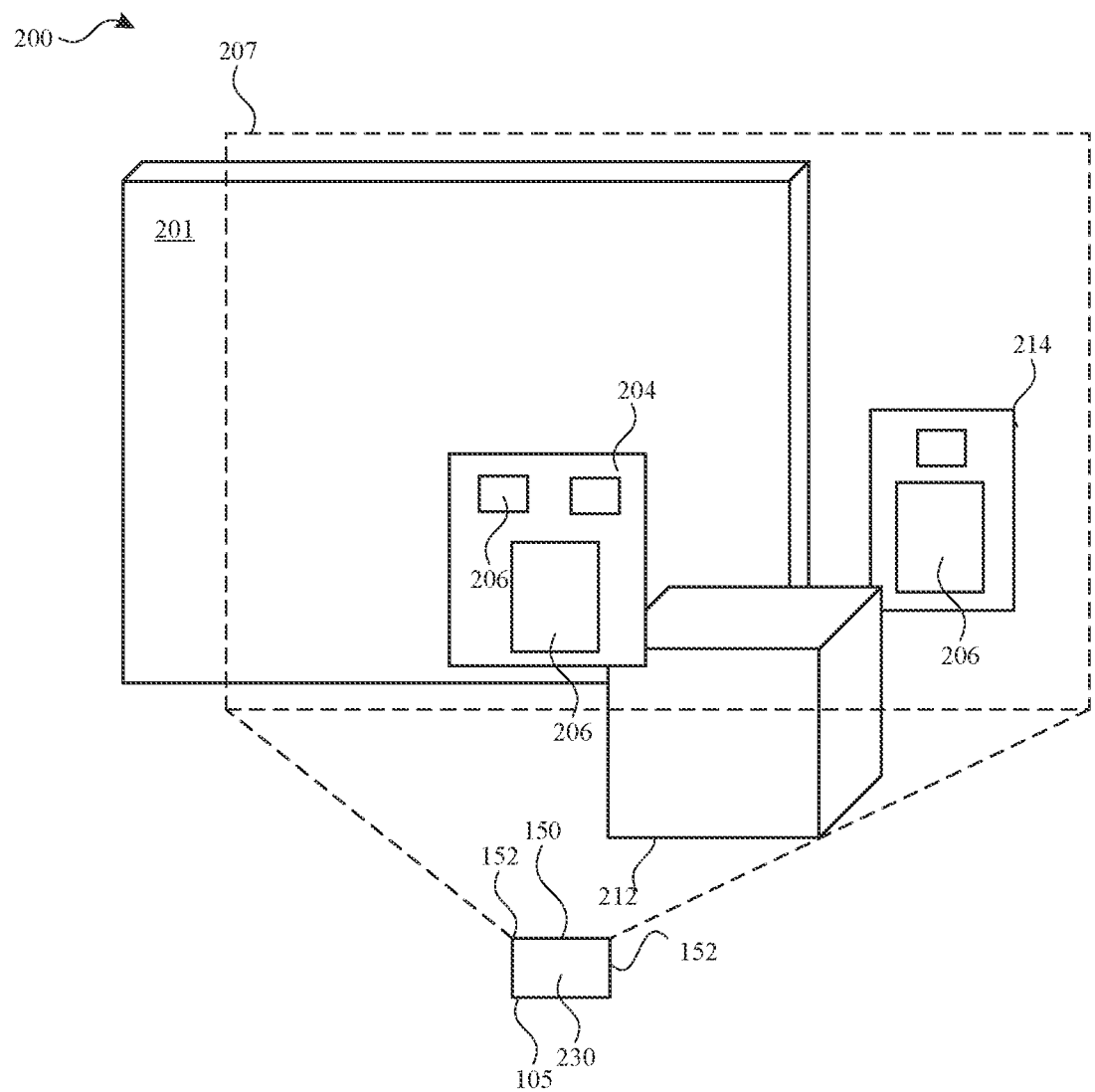
FIG. 2 illustrates an example of an extended reality environment including multiple user interfaces displayed, by an electronic device, to appear at multiple respective locations in a physical environment in accordance with aspects of the subject technology.

FIG. 2 illustrates an example of a physical environment 200 in which the electronic device 105 may be operated. In the example of FIG. 2, the physical environment 200 includes a physical wall 201 and a physical table 212. As shown, the electronic device 105 (e.g., display 230 of the electronic device 105) may display virtual content to be perceived by a user viewing the display 230 of the electronic device 105 at various locations in the physical environment 200 that are remote from the electronic device 105. When the virtual content is displayed by the electronic device 105 to cause the virtual content to appear to the user to be in the physical environment 200, the combined physical environment and the virtual content may form an XR environment. In one or more other implementations, the XR environment may be an entirely virtual environment the virtual content displayed in a manner that blocks the user's view of the physical environment 200.

In the example of FIG. 2, the display 230 of electronic device 105 displays a user interface (UI) 204 and a UI 214. For example, the UI 204 may be a UI of a first application (or operating system process) running on the electronic device 105, and the UI 214 may be a UI of a second application (or operating system process) running on the electronic device 105. As shown in FIG. 2, UI 204 and/or UI 214 may include one or more elements 206. Elements 206 may include text entry fields, buttons, selectable tools, scrollbars, menus, drop-down menus, links, plugins, image viewers, media players, sliders, gaming characters, other virtual content, or the like. Elements 206 may include two-dimensional elements and/or three-dimensional elements.

As shown in FIG. 2, the UI 204 and the UI 214 are displayed in a viewable area 207 of the display 230 of the electronic device 105. As shown, the UI 204 and the UI 214 may be displayed to be perceived by a user of the electronic device 105 (e.g., a view of the display 230) at different respective distances from the electronic device 105. In the example of FIG. 2, the UI 204 appears to be at a distance that is closer to the electronic device 105 (e.g., and partially in front of a physical table 212 in the physical environment 200) than the apparent distance of the UI 214 (e.g., which may appear partially behind the physical table 212). In one or more other implementations, the XR environment may be an entirely virtual environment in which the UI 204 and the UI 214 are displayed in a manner that blocks the user's view of the physical environment 200 (e.g., over a virtual background display by the display 230 of the electronic device 105).

Figure 3:
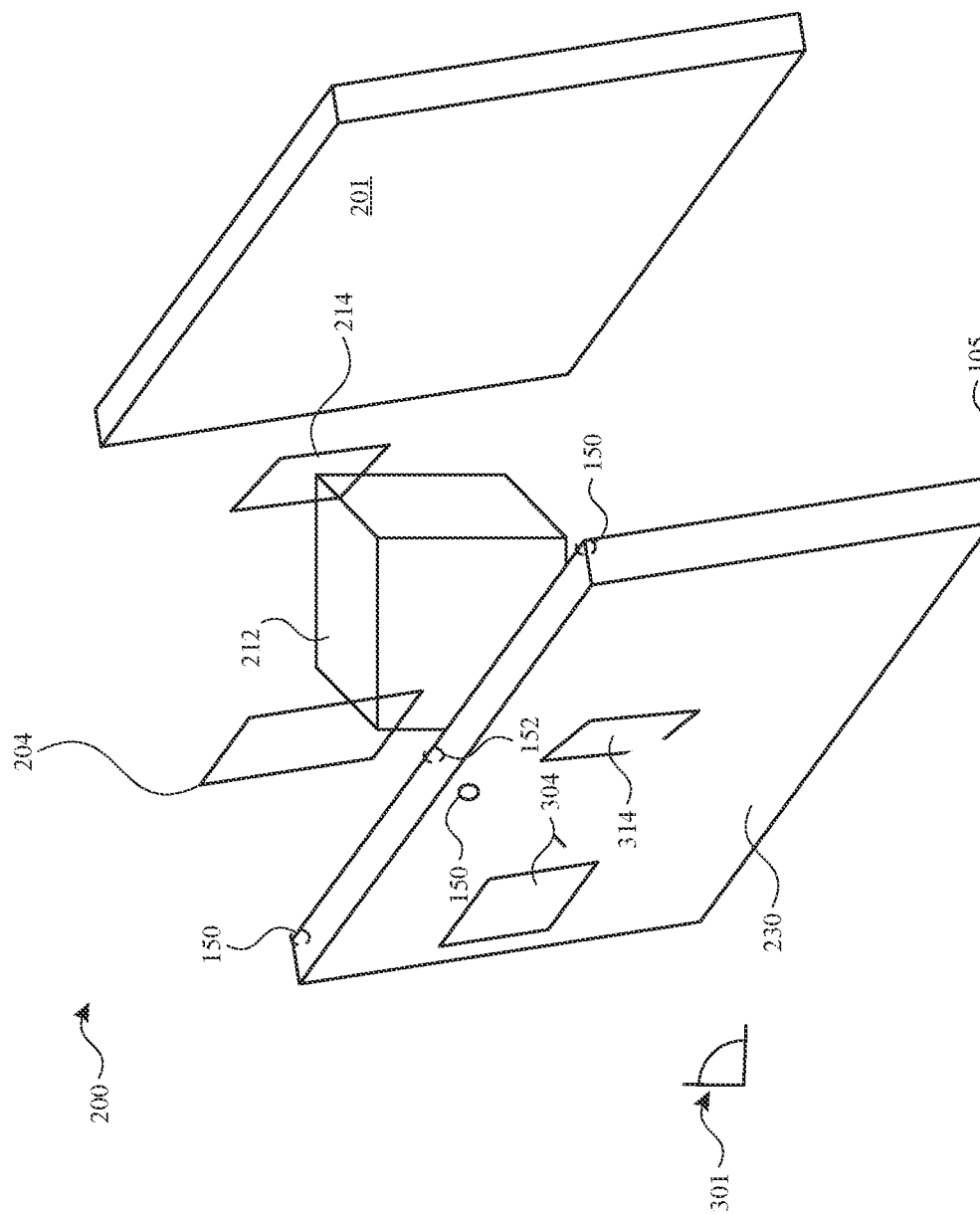
FIG. 3 illustrates a perspective view of the extended reality environment of FIG. 2 in accordance with one or more implementations.

FIG. 3 illustrates a perspective view of the XR environment of FIG. 2. As illustrated in FIG. 3, a representation 304 of the UI 204 may be displayed on the display 230 such that the UI 204 appears to a viewer 301 of the display 230 as if disposed in front of the physical table 212 in the physical environment 200. In this example, a representation 314 of the UI 214 appears to the viewer 301 as if disposed partially behind the physical table 212 in the physical environment 200. In one or more implementations, the UI 204 and/or the UI 214 can be displayed, moved, and/or interacted with using three-dimensional gestures detected by the electronic device 105 and provided to the underlying application of the UI.

However, in some or all use cases, it may be undesirable to allow the applications and/or system-level processes underlying the UI 204 and/or the UI 214 to be able to place the UIs at any apparent location within the physical environment 200. For example, providing an application with the ability to place and/or orient UI windows at any apparent location and/or orientation may allow the application to derive (e.g., from the angles of various UI elements with respect to the user) the location and/or other information about the user.

Figure 4:
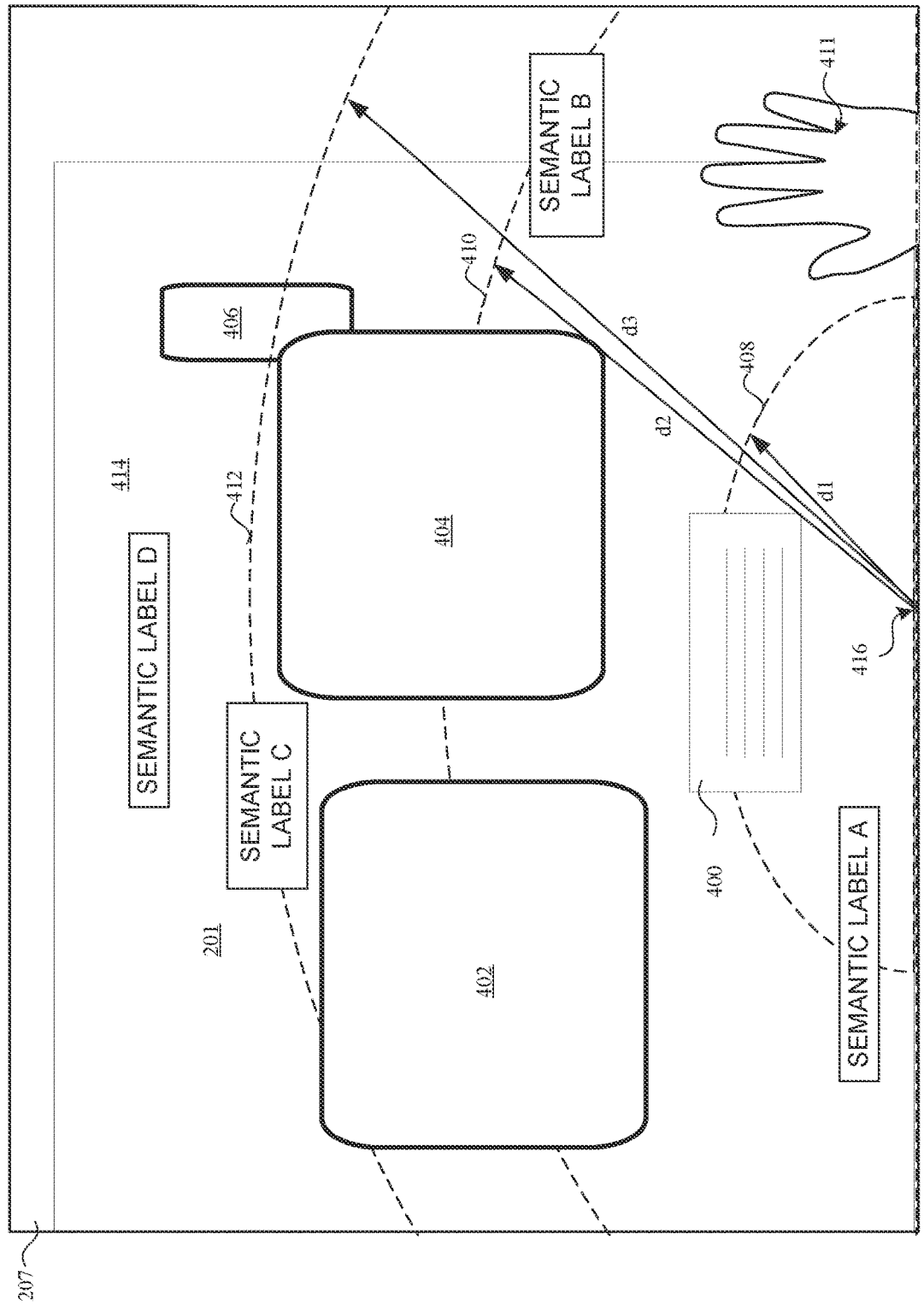
FIG. 4 illustrates an example of an extended reality environment having user interfaces displayed at multiple discrete distance layers in accordance with one or more implementations.

In accordance with aspects of the subject technology, the electronic device 105 may restrict the display of user interfaces and/or user interface elements to within one or more discrete volumetric interface layers. For example, a system-level process of the electronic device 105 may establish one or more discrete distance layers, within which UIs and/or UI elements can be displayed. For example, FIG. 4 illustrates an XR environment in which UIs are displayed in discrete distance layers (or volumetric interface layers). As shown, each of the discrete distance layers may be configured to present information that appears to be at a different predefined (e.g., predefined by a system-level process of an electronic device prior to presentation of the information) distance from the user and/or the electronic device.

In the example of FIG. 4, a user interface 400 is displayed in a first distance layer 408, a user interface 402 and a user interface 404 are displayed in a second distance layer 410, and a user interface 406 is displayed in a third distance layer 412. In the example of FIG. 4 a fourth distance layer 414 is also indicated. The fourth distance layer 414 may be a maximum distance layer, and may be a background, backdrop, or ambient layer at the locations of one or more background structures (e.g., the physical wall 201) in the physical environment.

As shown, the first distance layer 408 may be a ring of three-dimensional space at a first distance d1 from the electronic device 105, the second distance layer 410 may be a ring of three-dimensional space at a second distance d2, larger than the distance d1, from the electronic device 105, and the third distance layer 412 may be a ring of three-dimensional space at a third distance d3, larger than the second distance d2, from the electronic device. For example, each of the first distance layer 408, the second distance layer 410, and the third distance layer 412 may be a ring of three-dimensional space with a center point 416 at the electronic device 105 (e.g., a ring of three-dimensional space that is equidistant, at the respective distances d1, d2, and d3, from the electronic device 105). The first distance layer 408 may be located at a single first distance d1 or may span a range of distances (e.g., a range +/−Δd, wherein Δd is substantially less than d2−d1 and d3−d2) around the first distance d1. The second distance layer 410 may be located at a single second distance d2 or may span a range of distances (e.g., a range +/−Δd, wherein Δd is substantially less than d2−d1 and d3−d2) around the second distance d2. The third distance layer 412 may be located at a single third distance d3 or may be span a range of distances (e.g., a range +/−Δd, wherein Δd is substantially less than d2−d1 and d3−d2) around the third distance d3.

As indicated in FIG. 4, the first distance layer 408, the second distance layer 410, the third distance layer 412, and the fourth distance layer 414 may be discrete distance layers that are spatially separated from each other. In one or more implementations, providing discrete distance layers that span a range around, for example, a mean distance from the electronic device 105, can provide a user of the electronic device 105 with the ability to make relatively small adjustments to the distance of the UI from the user within a given distance layer (e.g., without switching distance layers). It is also appreciated that one or more UIs displayed at a given distance layer can be rotated around, for example, a pivot point that is within the given distance layer, and/or can include content, portions of which may extend three-dimensionally within and/or beyond the given distance layer. Although four distance layers, at four respective distances from the electronic device 105, are shown in the example of FIG. 4, in other examples, more than four or fewer than four distance layers can be provided by an electronic device such as the electronic device 105.

As illustrated in FIG. 4, one or multiple user interfaces can be displayed at each distance layer. In the example of FIG. 4, one user interface (e.g., user interface 400) is displayed at the first distance layer 408, two user interfaces (e.g., user interface 402 and user interface 404) are displayed at the second distance layer 410, and one user interface (e.g., user interface 406) is displayed at the third distance layer 412. However, this is merely illustrative, and any number of user interfaces can be displayed at each discrete distance layer in various use cases.

In one or more implementations, a user of the electronic device 105 may be provided with the ability to move the various user interfaces among the various discrete distance layers established by the system-level process. In one or more implementations, the applications running on the electronic device 105 may be prevented from modifying the discrete distance layers established by the system-level process. In one or more implementations, a user of the electronic device 105 may also be provided with the ability to move the various user interfaces to various different positions within a distance layer.

In various implementations, some user interfaces may be movable between any of the discrete distance layers. Some other user interfaces may be movable between only a subset of the discrete distance layers. For example, the user interface 402, the user interface 404, and/or the user interface 406 may be movable between only the second distance layer 410 and the third distance layer 412, or only the second distance layer 410, the third distance layer 412, and the fourth distance layer 414. Some other user interfaces may be designed only to be displayed in a single one of the discrete distance layers. For example, in FIG. 4, the user interface 400 is depicted as a virtual keyboard that is displayed in the first distance layer 408, which may be a utility layer or a nearest-distance layer. For example, the nearest-distance layer may be near located at a comfortable distance for the user to provide data input to one or more user interfaces in the layer. For example, because a virtual keyboard is a user interface element whose function is to accept detailed small-scale user inputs (e.g., typing gestures with the user's fingers), the virtual keyboard may be constrained to be displayed only in the first distance layer 408. Other examples of user interfaces and/or user interface elements that may be displayable only in the first distance layer 408 include a virtual keypad, a virtual pen or pencil, a virtual board game, or other data entry tools and/or elements. In one or more other implementations, a virtual keyboard or other data entry tool and/or element may be movable between two or more of the discrete distance layers. For example, a virtual keyboard or other data entry tool and/or element may be transformed into a different form when the virtual keyboard or other data entry tool and/or element is moved to a layer that is further from or nearer to the user. In the example of a virtual keyboard, the key size may be increase, and/or one or more keys (e.g., peripheral keys, letter keys, number keys, and/or any other subset of the keys of the virtual keyboard) may be removed when the virtual keyboard is moved to a distance layer that is further from the user. In this way, UIs and/or UI elements can transform to look differently (but provide the same underlying intent) when moved between discrete distance layers.

In one or more implementations, a user may be provided with the ability to adjust the distance of one or more of the discrete distance layers originally established by a system-level process (e.g., without notifying applications of the modification). For example, to enhance the accessibility of one or more of the user interfaces, a user of the electronic device 105 may be provided with the ability to move the first distance layer 408 toward or away from the user, and/or to move the second distance layer 410 toward or away from the user, resulting in a corresponding movement of any user interface as displayed in that layer. For example, a user with limited mobility may desire to have the utility layer (e.g., the first distance layer 408) closer to the user than the system defined first distance d1. As another example, a user with difficulty viewing nearby objects may desire to move the second distance layer 410 further out than the system defined second distance d2.

In one or more implementations, the type and/or amount of information displayed in a user interface may depend on which of the discrete distance layers the user interface is displayed in. For example, as shown in FIG. 4, the user interface 406, displayed at the third distance layer 412, has a smaller display area then the display area of the user interface 402 and the user interface 404, which are displayed in the second distance layer. As discussed in further detail hereinafter (see, e.g., FIGS. 6-8), an application and/or a system-level process may modify the size of the user interface and/or the type and/or amount of information displayed in the user interface when a user interface is moved (e.g., by a user) between distance layers.

As shown in FIG. 4, each of the discrete distance layers may have an associated label, such as a semantic label. In this example, the first distance layer 408 has a semantic label, A, the second distance layer 410 has a semantic label, B, the third distance layer 412 has a semantic label, C, and the fourth distance layer 415 has a semantic label, D. As one illustrative example, the first distance layer 408 may be labeled, by a system-level process of the electronic device 105, as a "utility layer". As one illustrative example, the second distance layer 410 may be labeled, by a system-level process of the electronic device 105, as a "work layer". As one illustrative example, the third distance layer 412 may be labeled, by a system-level process of the electronic device 105, as a "peripheral layer". As one illustrative example, the fourth distance layer 414 may be labeled, by a system-level process of the electronic device 105, as a "background layer", a "backdrop layer", or an "ambient layer". In one or more implementations, an application running on the electronic device 105 can provide a request, to a system-level process using the sematic labels, that a user interface of the application be displayed in the first distance layer 408, the second distance layer 410, the third distance layer 412, or the fourth distance layer 414 (e.g., by requesting display of the user interface in the work layer, the utility layer, the peripheral layer, or the background layer). The system-level process may then display the user interface of that application in the requested distance layer, without providing the application with any specific information as to the display location of the user interface (e.g., other than the semantic label of the distance layer in which the user interface is displayed).

Figure 5:
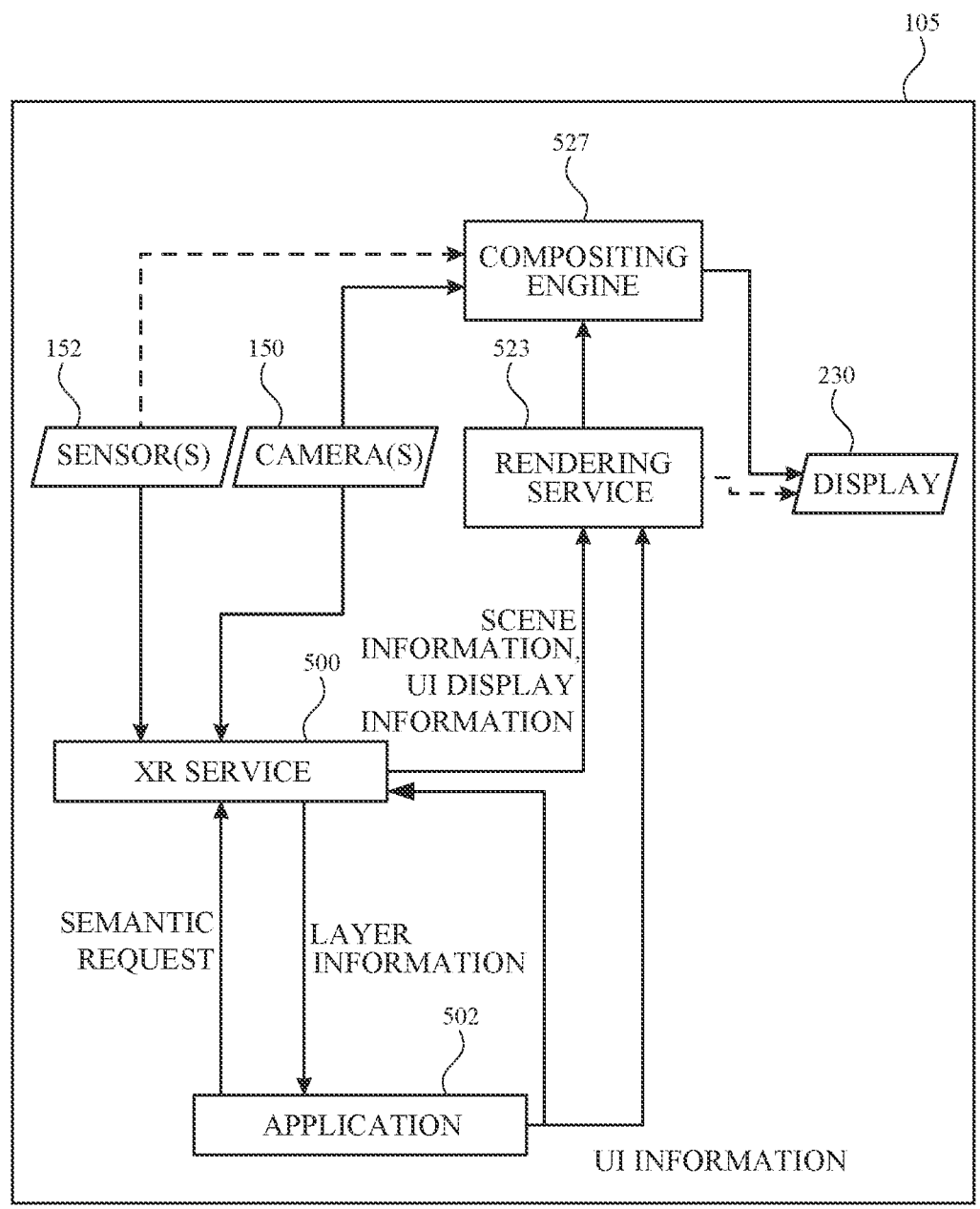
FIG. 5 illustrates an example electronic device providing volumetric interface layers for an application in accordance with one or more implementations.

FIG. 5 illustrates how a system-level process of the electronic device 105 may facilitate display of user interfaces and/or user interface elements in discrete distance layers. For example, FIG. 5 illustrates an example architecture that may be implemented by the electronic device 105 in accordance with one or more implementations of the subject technology. For explanatory purposes, portions of the architecture of FIG. 5 are described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 5 can be implemented in software or hardware, including by one or more processors and a memory device containing instructions, which when executed by the processor cause the processor to perform the operations described herein. For example, in FIG. 5, the trapezoidal boxes may indicate that the sensors 152, the camera(s) 150 and the display 230 may be hardware components, and the rectangular boxes may indicate that the XR service 500, the application 502, the rendering service 523, and the compositing service 527 may be implemented in software, including by one or more processors and a memory device containing instructions, which when executed by the processor cause the processor to perform the operations described herein.

In the example of FIG. 5, an application such as application 502 (e.g., an application having a UI 402, as illustrated in FIG. 4) may provide a request to display a user interface of the application 502 in a selected one of multiple discrete distance layers established by a system-level process, such as the XR service 500. For example, the request may be a sematic request that includes the semantic label of one or more of the discrete distance layers. For example, the request may include a request to display the user interface of the application 502 in the "utility layer", the "work layer", the "peripheral layer", or the "background layer" of FIG. 4. In one or more implementations, the XR service 500 may provide layer information to the application 502. For example, the layer information may indicate the layer (e.g., the requested layer if the request is approved) in which the UI of the application 502 will be displayed. As shown, the application 502 may provide UI information to one or more system-level processes, such as the XR service 500 and/or a rendering service 523. The system-level process(es) (e.g., the XR service, the rendering service 523, and/or a compositing service 527) may then display the user interface of the application 502, to be perceived by a user of the electronic device 105 at the distance corresponding to the requested distance layer.

For example, the application 502 may provide UI information, such as application data, to a rendering service 523 for rendering of the application data, such as for rendering of the UI 402 of the application. Application 502 may be a gaming application, a media player application, a content-editor application, a training application, a simulator application, a social media application, a productivity application, or generally any application that provides a UI or other content for display, such as in a discrete distance layer. The application data may include application-generated content (e.g., windows, buttons, tools, characters, images, videos, etc.) and/or user-generated content (e.g., text, images, etc.), and information for rendering the content in the UI. In one or more implementations, rendering service 523 renders the UI 402 for display by a display such as display 230 of the electronic device 105 based on the provided UI information. In one or more implementations, the XR service 500 may assign a portion of a physical environment of the electronic device withing the requested distance layer to the application 502 (e.g., while the application 502 is running on the electronic device 105 and while the UI 402 is displayed by the display 230). For example, the XR service 500 may provide UI display information that includes the assigned portion of the physical environment within the requested distance layer to the rendering service 523.

As shown in FIG. 5, additional information may be provided for display of the UI of the application 502. For example, sensors 152 may provide physical environment information (e.g., depth information from one or more depth sensors, motion information from one or more motion sensors), and/or user information to the XR service 500. Camera(s) 150 may also provide images of a physical environment and/or one or more portions of the user (e.g., the user's eyes, hands, face, etc.) to the XR service 500. XR service 500 may generate scene information, such as three-dimensional map, of some or all of the physical environment of electronic device 105 using the environment information (e.g., the depth information and/or the images) from sensors 152 and camera(s) 150. The XR service 500 may also determine a gaze location of gaze of the user, based on images and/or other sensor data representing the position and/or orientation of the user's eye(s). The XR service 500 may also identify a gesture (e.g., a hand gesture) performed by a user of the electronic device 105, based on images and/or other sensor data representing the position and/or orientation of the user's hand(s) and/or arm(s).

Application 502 may include code that, when executed by one or more processors of electronic device 105, generates UI information (e.g., application data), for display of the UI 402 in a requested distance layer as established by the XR service 500. Application 502 may include code that, when executed by one or more processors of electronic device 105, modifies and/or updates the UI information based on user information (e.g., a gaze location and/or a gesture input) provided by the XR service 500. Application 502 may include code that, when executed by one or more processors of electronic device 105, modifies and/or updates the UI information when the XR service 500 indicates (e.g., in the layer information) to the application 502 that the UI has been moved (e.g., by the user) from the requested distance layer to a new distance layer.

Once the UI information has been generated, the UI information can be provided to the XR service 500 and/or the rendering service 523, as illustrated in FIG. 5. As shown, scene information can also be provided to rendering service 523. The scene information provided from the XR service 500 to the rendering service 523 can include or be based on, as examples, environment information such as a depth map of the physical environment, and/or object information for detected objects in the physical environment. Rendering service 523 can then render the UI information from application 502 for display by display 230 of electronic device 105 to appear at a desired location in the physical environment 200 or in an entirely virtual environment. For example, a representation of the UI 402 may be rendered for display at the appropriate location on the display 230, to appear to be located at in the requested or indicated distance layer in the physical environment 200, using the UI information (which may be based on the distance layer) and using the scene information from the XR service 500. Display 230 may be, for example, an opaque display, and camera(s) 150 may be configured to provide a pass-through video feed to the opaque display. The UI 402 may be rendered for display at a location on the display corresponding to the location of the requested or indicated distance layer in the pass-through video. Display 230 may be, as another example, a transparent or translucent display. The UI 204 may be rendered for display at a location on the display corresponding to a direct view, through the transparent or translucent display, of the location of the distance layer in the physical environment 200.

As shown, in one or more implementations, electronic device 105 can also include a compositing service 527 that composites video images of the physical environment, based on images from camera(s) 150, for display together with the UI information (e.g., UI 402) from rendering service 523. For example, compositing service 527 may be provided in an electronic device 105 that includes an opaque display, to provide pass-through video to the display. In an electronic device 105 that is implemented with a transparent or translucent display that allows the user to directly view the physical environment, compositing service 527 may be omitted or unused in some circumstances, or may be incorporated in rendering service 523. Although the example of FIG. 5 illustrates a rendering service 523 that is separate from XR service 500, it should be appreciated that XR service 500 and rendering service 523 may form a common system-level service and/or that rendering operations for rendering content for display can be performed by the XR service 500. Although the example of FIG. 5 illustrates a rendering service 523 that is separate from application 502, it should be appreciated that, in some implementations, application 502 may render content for display by display 230 without using a separate rendering engine. Although a single application 502 is depicted in FIG. 5, it is appreciated that multiple applications (e.g., including applications generating the UI 404 or the UI 406) may be running concurrently on the electronic device 105, providing semantic requests for distance layers for display of respective UIs thereof, and generating application data for rendering of respective UIs for display by display 230 in the respective requested distance layers. In one or more implementations, compositing service 527 may composite UI information for multiple UIs of multiple applications for concurrent display, as in the example of FIG. 4.

Figure 6:
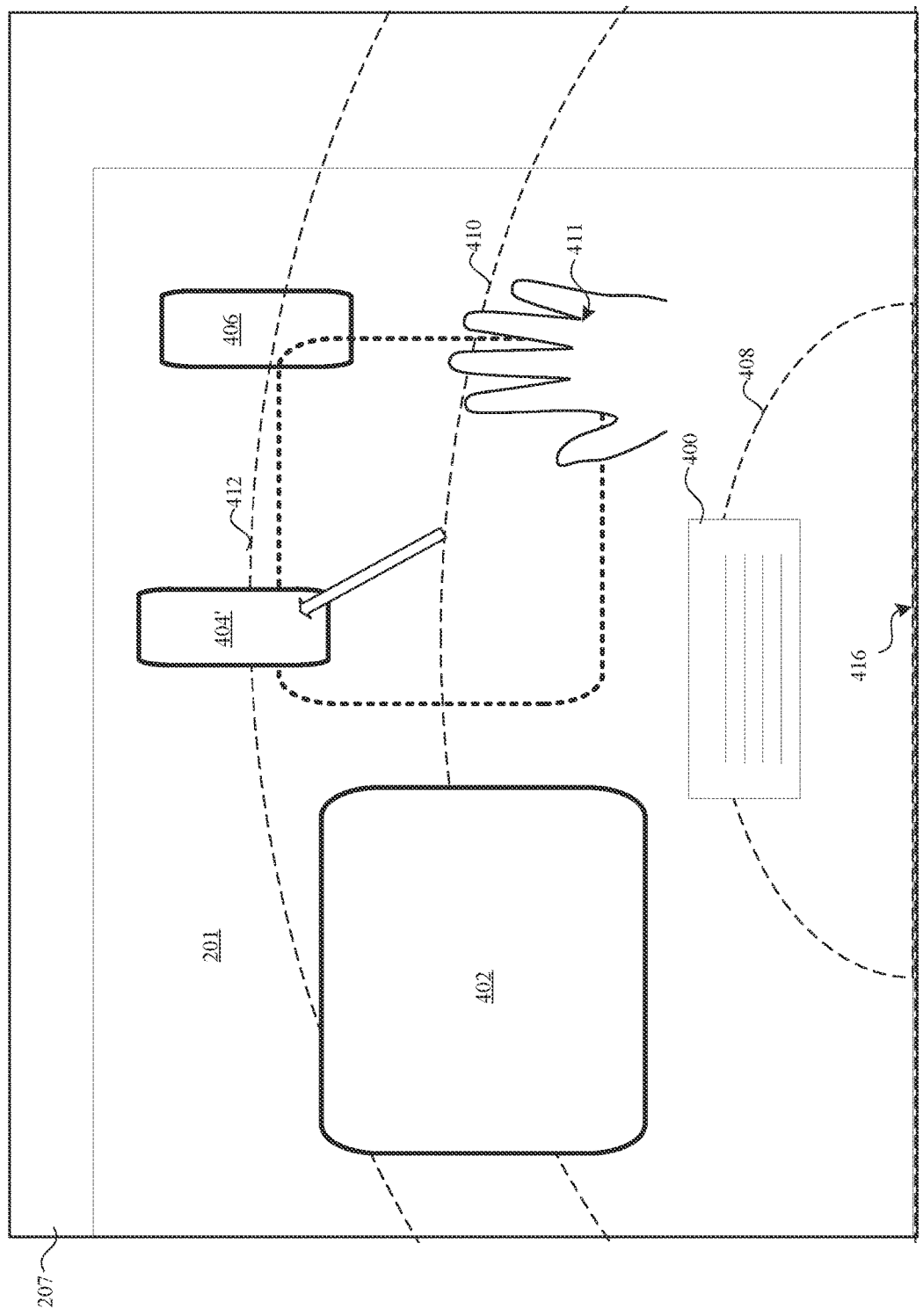
FIG. 6 illustrates an example of a user moving a user interface between discrete distance layers in accordance with one or more implementations.

As described herein, in one or more implementations, a user may be provided with the ability to move a UI from one discrete distance layer to another discrete distance layer. For example, FIG. 6 illustrates an example in which a user performs a gesture (e.g., with the user's hand 411, which may be viewable directly by the user through a portion of the display 230 of the electronic device, or which may be a video or virtual image of the user's hand displayed by the display 230) to move the UI 404 from the second distance layer 410 to the third distance layer 412. As shown, responsive to the user gesture to move the UI 404, the electronic device 105 may move the apparent displayed location of the UI 404 from the second distance layer 410 to the third distance layer 412. As shown, the UI 404 may also be modified to a reduced UI 404' responsive to the move from the second distance layer 410 to the third distance layer 412. In the example of FIG. 6, the size of the reduced UI 404' in the third distance layer 412 is reduced, relative to the size of the UI 404 displayed in the second distance layer 410. As discussed in further detail hereinafter, the amount of information, the type of information, and/or the information density of the information displayed in the reduced UI 404' may also be reduced relative to the amount of information, the type of information, and/or the information density of the information displayed in the UI 404 displayed in the second distance layer 410.

For example, responsive to a user request (e.g., to the XR service 500 of FIG. 5) to move the UI 404 from the second distance layer 410 to the third distance layer 412, the XR service 500 and/or the application 502 may modify the UI 404 from, for example, a full-UI form to a reduced form for the reduced UI 404', such as a widget form of the UI. In one or more implementations, the XR service 500 may notify the application 502 (e.g., by providing layer information, such as the semantic label of the new layer, as illustrated in FIG. 5) of the new layer in which the UI is to be displayed and may receive updated (e.g., reduced) UI information for display in the reduced UI 404'. In one or more other implementations, the XR service 500 may modify the UI 404 to the reduced UI 404' without notifying the application 502 of the change. For example, the application 502 may have previously provided a declarative definition of both the UI 404 and the reduced UI 404' to the XR service 500, and the XR service 500 and/or the rendering service 523 may display the UI 404 or the reduced UI 404' using the declarative definitions thereof, based on which of the distance layers the UI is displayed in.

Figure 7:
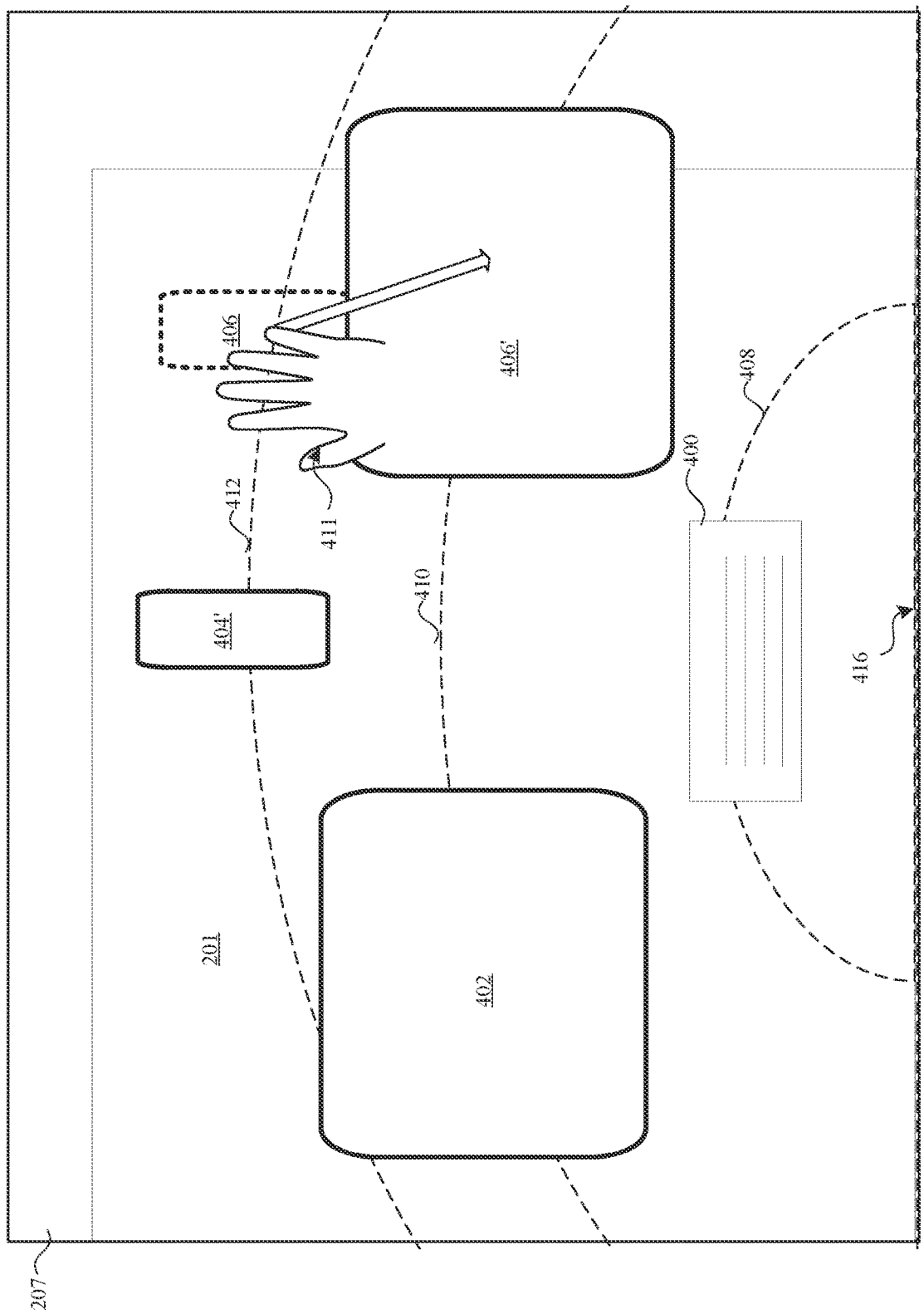
FIG. 7 illustrates another example of a user moving a user interface between discrete distance layers in accordance with one or more implementations.

In the example of FIG. 6, a user input causes the UI 404 that is displayed in the second distance layer 410 to be moved to the third distance layer 412 and resultingly modified to the reduced UI 404'. FIG. 7 illustrates another example use case in which the UI 406 that is displayed in the third distance layer 412 is moved (e.g., responsive to a user input, such as a gesture made by the user's hand 411) from the third distance layer 412 to the second distance layer 410. In this example, the UI 406 is also modified responsive to the move between discrete distance layers. In the example of FIG. 7, the UI 406, which is displayed in a reduced-UI form in the third distance layer 412, is expanded to form a full UI 406'. In this example, the full UI 406' displayed in the second distance layer 410 may include more information (e.g., at a higher information density) than the UI 406 included when displayed in the third distance layer 412.

Figure 8:
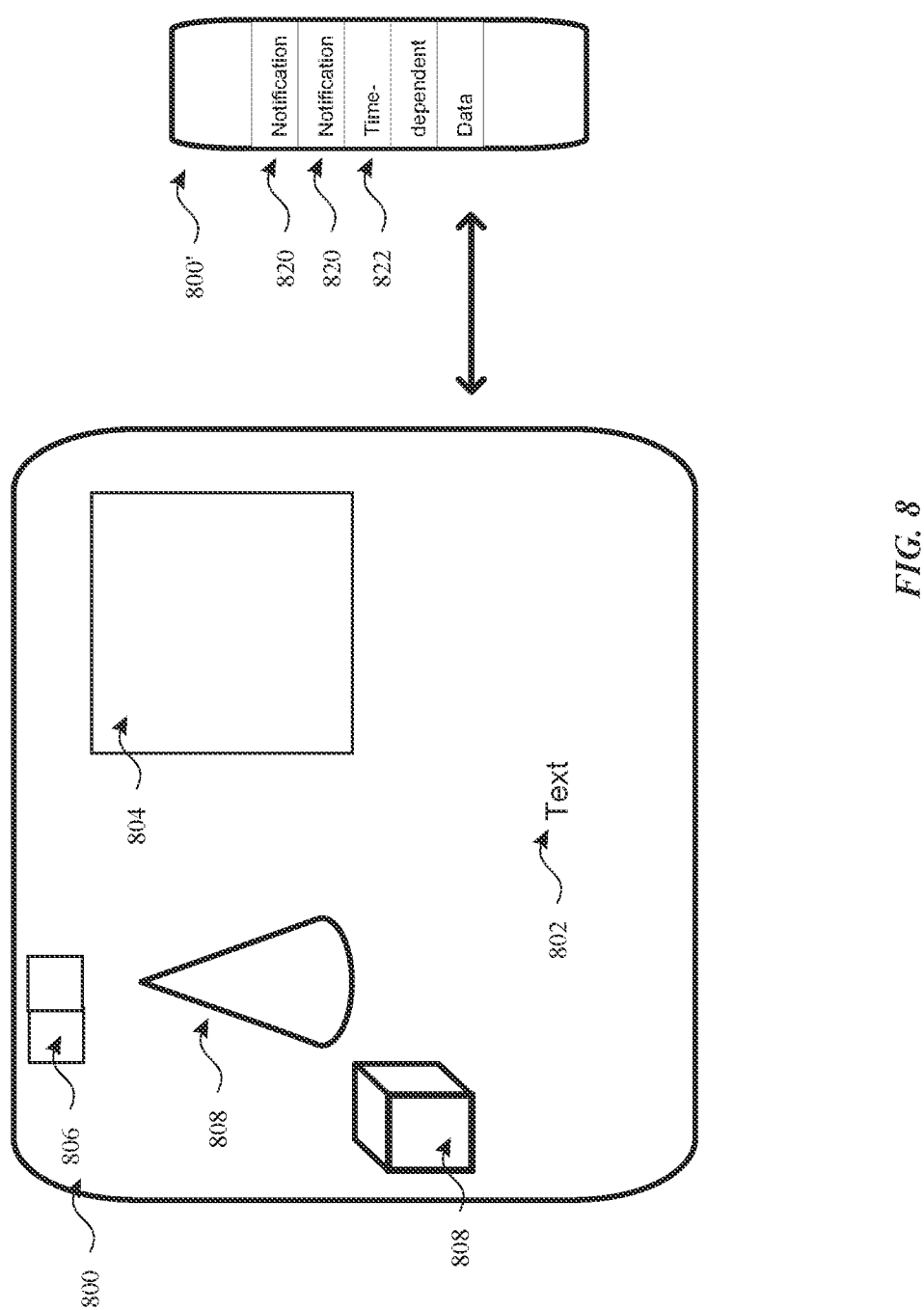
FIG. 8 illustrates an example of a modification of the content of a user interface corresponding to a change in discrete distance layers in accordance with one or more implementations.

FIG. 8 illustrates an example of how a UI may be modified responsive to a change in the distance layer in which that UI is displayed. As shown in FIG. 8, a user interface, such as the user interface 800 (which may be an implementation of any of the user interfaces 400, 402, or 406 of FIG. 4) may include various types of content. For example, the UI 800 may include text data 802, image content 804 (e.g., static images, video feeds, animations, and/or other image based content), control features 806 (e.g., virtual buttons, knobs, sliders, scrollbars, links, toolbars, data entry fields, and/or other user interface elements), and/or three-dimensional content 808 (e.g., static and/or dynamic content that appears to extend toward or away from the user of the electronic device 105 in a displayed XR environment).

In one or more implementations, the text data 802 may include static text and/or dynamic text, such as notifications. Notifications may include, as examples, messages (e.g., text messages, instant messages, email messages), calendar alerts, news alerts, application-specific notifications, and/or any other notifications or alerts. In one or more implementations, the image content 804 may include image-based representations of static and/or dynamic data. The dynamic data may include time-dependent data, such as weather data, stocks data, news data, application-specific time-dependent data, calendar events, sports scores, and/or other time-dependent data that can be generated by the electronic device 105 and/or obtained from a remote source such as the servers 130 of FIG. 1.

As illustrated by FIG. 8, when the UI 800 is moved (e.g., by a user) from one distance layer (e.g., a nearer distance layer, such as the second distance layer 410 described herein) to another distance layer (e.g., a relatively further distance layer, such as the third distance layer 412 described herein), the UI 800 (e.g., a full UI or expanded UI) may be changed to a reduced UI 800' that includes less information than the UI 800 (e.g., and the less information may be displayed with a lower information density than the density with which information is displayed in the UI 800). For example, in FIG. 8, the reduced UI 800' includes only notifications 820 and time-dependent data 822. For example, the notifications 820 may be a subset of the text data 802 of the UI 800 or a summary some or all of the text data 802. For example, the time-dependent data 822 may be a subset of the image content 804 or a summary of, or re-presentation of, some or all of the image content 804 of the UI 800. In this way, when the user interface of an application is displayed to appear in a distance layer that is relatively near to the user (e.g., a "work" layer), the user interface can have a full or rich set of data and tools with which the user can interact; and when the user interface of the application is moved to a distance layer that is relatively further from the user (e.g., a "peripheral" layer), the user interface can continue to provide a subset of the information (e.g., a time-dependent subset of the information, and/or a subset of the information that is relevant to the user) in the user interface for viewing by the user. As discussed herein in connection with, for example, FIG. 7, the reduced UI 800' can also be modified to the UI 800 responsive to a user moving the UI 800' from a relatively further distance layer (e.g., the third distance layer 412) to a relatively nearer distance layer (e.g., the second distance layer 410).

Figure 9:
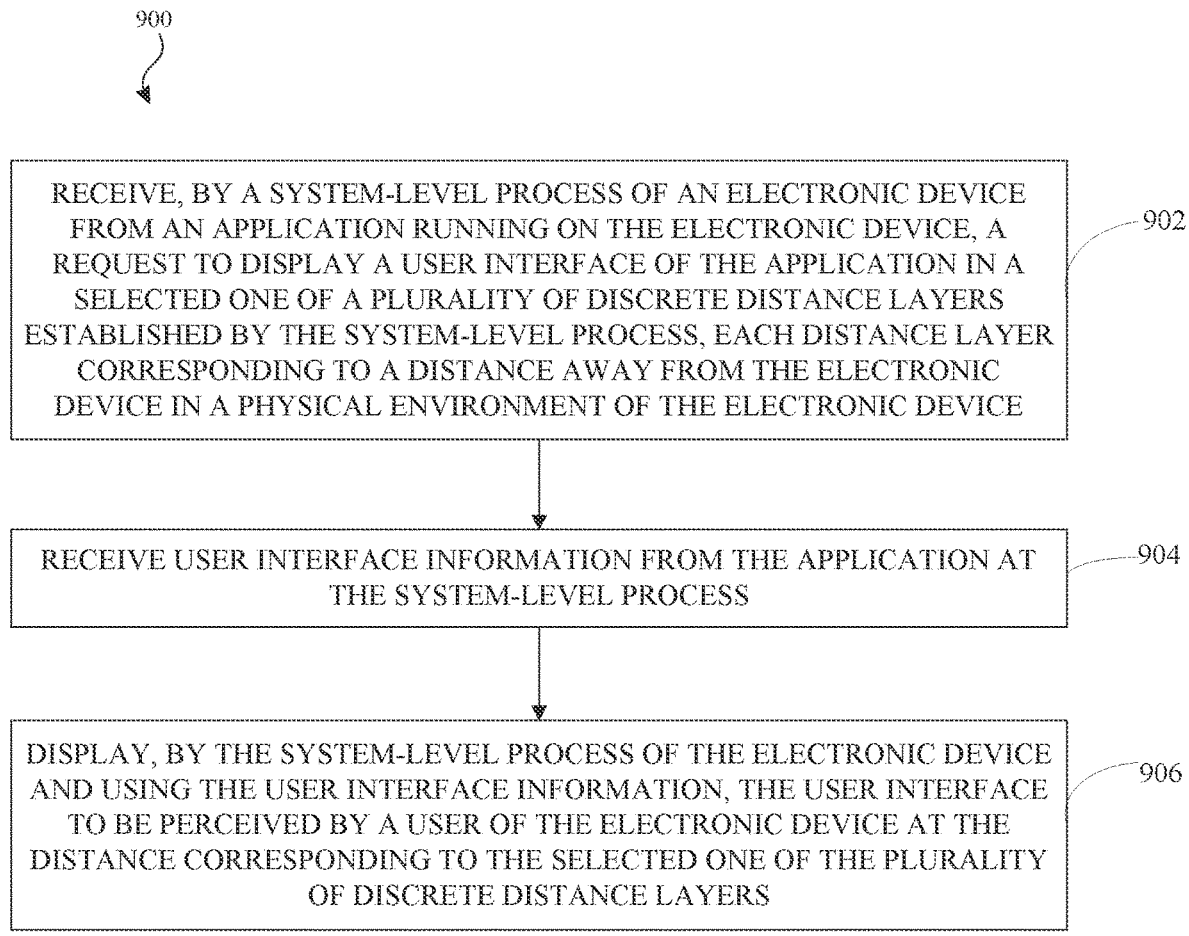
FIG. 9 illustrates a flow diagram of an example process for providing volumetric interface layers according to aspects of the subject technology.

FIG. 9 illustrates a flow diagram of an example process 900 for display of a user interface in a volumetric interface layer in accordance with implementations of the subject technology. For explanatory purposes, the process 900 is primarily described herein with reference to the electronic device 105 of FIG. 1. However, the process 900 is not limited to the electronic device 105 of FIG. 1, and one or more blocks (or operations) of the process 900 may be performed by one or more other components of other suitable devices, including the electronic device 104, the electronic device 110, and/or the electronic device 115. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 9, at block 902, a system-level process (e.g., XR service 500 and/or rendering service 523) of an electronic device (e.g., electronic device 105) may receive, from an application (e.g., application 502) running on the electronic device, a request to display a user interface (e.g., UI 400, UI 402, UI 404, UI 406, or UI 800) of the application in a selected one of multiple discrete distance layers (e.g., the first distance layer 408, the second distance layer 410, the third distance layer 412, and/or the fourth distance layer 414 of FIG. 4) established by the system-level process. Each distance layer may correspond to a distance (e.g., distances d1, d2, or d3) away from the electronic device in an environment (e.g., a physical environment such as the physical environment 200 or a virtual environment) of the electronic device. For example, the process 900 may also include establishing, by the system-level process of the electronic device, the multiple discrete distance layers. For example, one or more of the multiple discrete distance layers may correspond to one or more respective rings of three-dimensional space, each with a center point at the electronic device (e.g., as described herein in connection with FIG. 4).

In one or more implementations, each of the multiple discrete distance layers may have a respective semantic label. In one or more implementations, the request may include the respective semantic label for the selected one of the multiple discrete distance layers. In one or more implementations, the system-level process may notify the application which layer the UI of that application is displayed in, by providing semantic label to the application, without providing any other information about the displayed location of the UI.

At block 904, user interface information from the application may be received at the system-level process (e.g., XR service 500 and/or rendering service 523). In various implementations, the user interface information may include a rendered user interface, or application data (e.g., one or more layer trees, UI content, and/or declarative definitions) that can be used by the system-level process for rendering the user interface. In one or more implementations, the application may provide two or more different declarative definitions of the user interface (e.g., a declarative definition for rendering a full UI of the application and a declarative definition for rendering a reduced UI of the application) for display of the user interface in two or more respective ones of the discrete distance layers (e.g., as described herein in connection with FIGS. 6-8).

At block 906, the system-level process of the electronic device may display, using the user interface information, the user interface to be perceived by a user of the electronic device at the distance corresponding to the selected one of the multiple discrete distance layers. For example, displaying the user interface to be perceived by the user at the distance corresponding to the selected one of the multiple discrete distance layers may include displaying the user interface to be perceived by the user at the distance corresponding to the selected one of the multiple discrete distance layers and with an information density (e.g., and/or an amount and/or type of information) that corresponds to the selected one of the multiple discrete distance layers (e.g., as described herein in connection with FIG. 8).

In one or more implementations, the process 900 may also include receiving (e.g., at the system-level process, such as at the XR service 500) a user request from the user of the electronic device to move the user interface from the selected one of the discrete distance layers to a different one of the discrete distance layers. The system-level process may move, responsive to the user request, the user interface from the selected one of the discrete distance layers to the different one of the discrete distance layers. In one or more implementations, the system-level process may animate the movement of the user interface from the selected one of the discrete distance layers to the different one of the discrete distance layers. The electronic device 105 (e.g., the system-level process and/or the application) may modify the information density (e.g., and/or the amount and/or type of information) of the user interface to a modified information density (e.g., and/or the amount and/or type of information) that corresponds to the different one of the plurality of discrete distance layers (e.g., as described herein in connection with FIG. 8).

In one or more implementations, the process 900 may also include, while displaying the user interface to be perceived by the user of the electronic device at the distance corresponding to the selected one of the multiple discrete distance layers, displaying another user interface (e.g., another of the UI 400, UI 402, UI 404, UI 406, or UI 800) to be perceived by the user of the electronic device at a different distance corresponding to a different one of the multiple discrete distance layers. In one or more implementations, the user interface is displayed at the distance corresponding to the selected one of the plurality of discrete distance layers with an information density (e.g., and/or an amount and/or type of information) that corresponds to the selected one of the multiple discrete distance layers, and the other user interface is displayed at the different distance corresponding to the different one of the multiple discrete distance layers with another information density (e.g., and/or another amount and/or type of information) different from the information density (e.g., and/or amount and/or type of information) of the user interface.

In one or more implementations, the user interface may be movable, by the user, between any of the multiple discrete distance layers, and the other user interface may be movable only between a subset of the discrete distance layers. In one or more implementations, the user interface may be movable, by the user, between any of the multiple discrete distance layers, and the other user interface may be displayable only in the different one of the discrete distance layers.

In one or more implementations, the process 900 may also include modifying the one or more of the multiple discrete distance layers established by the system-level process according to a user request to modify the one or more of the multiple discrete distance layers. For example, modifying the one or more of the multiple discrete distance layers may include changing the distance of one or more of the multiple discrete distance layers in accordance with a user request to change distance (e.g., to move one or more of the discrete distance layers closer to or further from the electronic device).

As described above, aspects of the subject technology may include the collection of data. The present disclosure contemplates that in some instances, this collected data may include personal information data that uniquely identifies or can be used to identify a specific person. Such personal information data can include demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing volumetric interface layers for an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing volumetric interface layers for an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
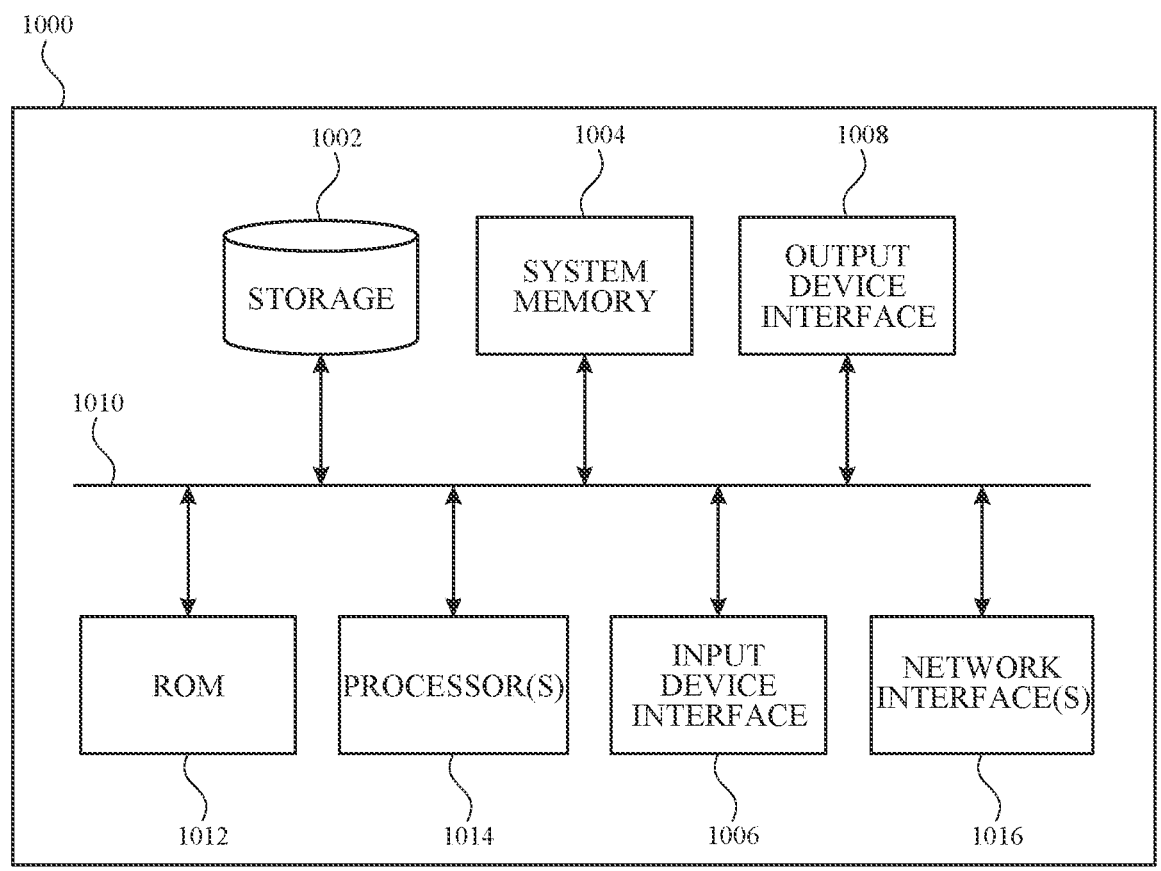
FIG. 10 illustrates an example computing device with which aspects of the subject technology may be implemented.

FIG. 10 illustrates an example computing device with which aspects of the subject technology may be implemented in accordance with one or more implementations. The computing device 1000 can be, and/or can be a part of, any computing device or server for generating the features and processes described above, including but not limited to a laptop computer, a smartphone, a tablet device, a wearable device such as a goggles or glasses, and the like. The computing device 1000 may include various types of computer readable media and interfaces for various other types of computer readable media. The computing device 1000 includes a permanent storage device 1002, a system memory 1004 (and/or buffer), an input device interface 1006, an output device interface 1008, a bus 1010, a ROM 1012, one or more processing unit(s) 1014, one or more network interface(s) 1016, and/or subsets and variations thereof.

The bus 1010 collectively represents all system, peripheral, and chipset buses that communicatively connect the numerous internal devices of the computing device 1000. In one or more implementations, the bus 1010 communicatively connects the one or more processing unit(s) 1014 with the ROM 1012, the system memory 1004, and the permanent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations.

The ROM 1012 stores static data and instructions that are needed by the one or more processing unit(s) 1014 and other modules of the computing device 1000. The permanent storage device 1002, on the other hand, may be a read-and-write memory device. The permanent storage device 1002 may be a non-volatile memory unit that stores instructions and data even when the computing device 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1014 may need at runtime. In one or more implementations, the processes of the subject disclosure are stored in the system memory 1004, the permanent storage device 1002, and/or the ROM 1012. From these various memory units, the one or more processing unit(s) 1014 retrieves instructions to execute and data to process in order to execute the processes of one or more implementations.

The bus 1010 also connects to the input and output device interfaces 1006 and 1008. The input device interface 1006 enables a user to communicate information and select commands to the computing device 1000. Input devices that may be used with the input device interface 1006 may include, for example, alphanumeric keyboards and pointing devices (also called "cursor control devices"). The output device interface 1008 may enable, for example, the display of images generated by computing device 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1010 also couples the computing device 1000 to one or more networks and/or to one or more network nodes through the one or more network interface(s) 1016. In this manner, the computing device 1000 can be a part of a network of computers (such as a LAN, a wide area network ("WAN"), or an Intranet, or a network of networks, such as the Internet. Any or all components of the computing device 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by a system-level process of an electronic device from an application running on the electronic device, a request to display a user interface of the application in a selected one of a plurality of discrete distance layers established by the system-level process, each distance layer corresponding to a distance away from the electronic device in a physical environment of the electronic device;
   receiving user interface information from the application at the system-level process; and
   displaying, by the system-level process of the electronic device and using the user interface information, the user interface to be perceived by a user of the electronic device at the distance corresponding to the selected one of the plurality of discrete distance layers.

2. The method of claim 1, wherein the each of the plurality of discrete distance layers has a respective semantic label, and wherein the request comprises the respective semantic label for the selected one of the plurality of discrete distance layers.

3. The method of claim 1, wherein displaying the user interface to be perceived by the user at the distance corresponding to the selected one of the plurality of discrete distance layers comprises displaying the user interface to be perceived by the user at the distance corresponding to the selected one of the plurality of discrete distance layers and with an information density that corresponds to the selected one of the plurality of discrete distance layers.

4. The method of claim 3, further comprising:
   receiving a user request from the user of the electronic device to move the user interface from the selected one of the discrete distance layers to a different one of the discrete distance layers; and
   moving, by the system-level process responsive to the user request, the user interface from the selected one of the discrete distance layers to the different one of the discrete distance layers.

5. The method of claim 4, further comprising modifying the information density of the user interface to a modified information density that corresponds to the different one of the plurality of discrete distance layers.

6. The method of claim 1, further comprising, while displaying the user interface to be perceived by the user of the electronic device at the distance corresponding to the selected one of the plurality of discrete distance layers, displaying an other user interface to be perceived by the user of the electronic device at a different distance corresponding to a different one of the plurality of discrete distance layers.

7. The method of claim 6, wherein the user interface is displayed at the distance corresponding to the selected one of the plurality of discrete distance layers with an information density that corresponds to the selected one of the plurality of discrete distance layers, and wherein the other user interface is displayed at the different distance corresponding to the different one of the plurality of discrete distance layers with an other information density different from the information density of the user interface.

8. The method of claim 6, wherein the user interface is movable, by the user, between any of the plurality of discrete distance layers, and wherein the other user interface is movable only between a subset of the discrete distance layers.

9. The method of claim 6, wherein the user interface is movable, by the user, between any of the plurality of discrete distance layers, and wherein the other user interface is displayable only in the different one of the discrete distance layers.

10. The method of claim 1, further comprising establishing, by the system-level process of the electronic device, the plurality of discrete distance layers.

11. The method of claim 10, further comprising:
modifying the one or more of the plurality of discrete distance layers established by the system-level process according to a user request to modify the one or more of the plurality of discrete distance layers.

12. The method of claim 1, wherein at least one of the plurality of discrete distance layers comprises a ring of three-dimensional space with a center point at the electronic device.

13. An electronic device, comprising:
a memory; and
one or more processors configured to:
receive, by a system-level process of the electronic device from an application running on the electronic device, a request to display a user interface of the application in a selected one of a plurality of discrete distance layers established by the system-level process, each distance layer corresponding to a distance away from the electronic device in a physical environment of the electronic device;
receive user interface information from the application at the system-level process; and
display, by the system-level process of the electronic device and using the user interface information, the user interface to be perceived by a user of the electronic device at the distance corresponding to the selected one of the plurality of discrete distance layers.

14. The electronic device of claim 13, wherein the each of the plurality of discrete distance layers has a respective semantic label, and wherein the request comprises the respective semantic label for the selected one of the plurality of discrete distance layers.

15. The electronic device of claim 14, wherein the one or more processors are configured to display the user interface to be perceived by the user at the distance corresponding to the selected one of the plurality of discrete distance layers by displaying the user interface to be perceived by the user at the distance corresponding to the selected one of the plurality of discrete distance layers and with an information density that corresponds to the selected one of the plurality of discrete distance layers.

16. The electronic device of claim 15, wherein the one or more processors are further configured to:
receive a user request from the user of the electronic device to move the user interface from the selected one of the discrete distance layers to a different one of the discrete distance layers; and
move, by the system-level process responsive to the user request, the user interface from the selected one of the discrete distance layers to the different one of the discrete distance layers.

17. The electronic device of claim 16, wherein the one or more processors are further configured to modify the information density of the user interface to a modified information density that corresponds to the different one of the plurality of discrete distance layers.

18. A non-transitory computer-readable medium storing instructions that, when executed by one or more processors, cause the one or more processors to perform operations comprising:
receiving, by a system-level process of an electronic device from an application running on the electronic device, a request to display a user interface of the application in a selected one of a plurality of discrete distance layers established by the system-level process, each distance layer corresponding to a distance away from the electronic device in a physical environment of the electronic device;
receiving user interface information from the application at the system-level process; and
displaying, by the system-level process of the electronic device and using the user interface information, the user interface to be perceived by a user of the electronic device at the distance corresponding to the selected one of the plurality of discrete distance layers.

19. The non-transitory computer-readable medium of claim 18, the operations further comprising, while displaying the user interface to be perceived by the user of the electronic device at the distance corresponding to the selected one of the plurality of discrete distance layers, displaying an other user interface to be perceived by the user of the electronic device at a different distance corresponding to a different one of the plurality of discrete distance layers.

20. The non-transitory computer-readable medium of claim 19, wherein the user interface is displayed at the distance corresponding to the selected one of the plurality of discrete distance layers with an information density that corresponds to the selected one of the plurality of discrete distance layers, and wherein the other user interface is displayed at the different distance corresponding to the different one of the plurality of discrete distance layers with an other information density different from the information density of the user interface.

* * * * *